United States Patent
Fujishige et al.

(10) Patent No.: US 7,796,293 B2
(45) Date of Patent: Sep. 14, 2010

(54) IMAGE PROCESSING APPARATUS, AND COMPUTER PRODUCT, ALLOWING SELECTIVE RESOLUTION OF AN AREA OF A DOCUMENT

(75) Inventors: Takezo Fujishige, Kanagawa (JP); Kiyoshi Kasatani, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1385 days.

(21) Appl. No.: 10/912,084

(22) Filed: Aug. 6, 2004

(65) Prior Publication Data
US 2005/0062991 A1  Mar. 24, 2005

(30) Foreign Application Priority Data
Aug. 8, 2003 (JP) .............................. 2003-290258

(51) Int. Cl.
G06F 3/12 (2006.01)
G06F 15/00 (2006.01)
H04N 1/387 (2006.01)
H04N 1/393 (2006.01)
H04N 1/46 (2006.01)
G06K 9/34 (2006.01)
G06K 9/40 (2006.01)
G06K 9/36 (2006.01)
G06K 9/20 (2006.01)
G06K 9/32 (2006.01)

(52) U.S. Cl. .................. 358/1.2; 358/450; 358/452; 358/453; 358/462; 358/537; 358/538; 382/171; 382/173; 382/254; 382/282; 382/284; 382/298; 382/299

(58) Field of Classification Search ............... 358/1.9, 358/1.2, 450, 452, 453, 462, 537, 538; 382/171, 382/173, 254, 282, 284, 298, 299
See application file for complete search history.

(56) References Cited

U.S. PATENT DOCUMENTS

| 4,627,707 | A  | * | 12/1986 | Tani et al. ............... 399/184 |
| 5,937,232 | A  | * | 8/1999  | Taguchi et al. ............ 399/81 |
| 6,483,609 | B1 | * | 11/2002 | Ueno et al. .............. 358/434 |
| 6,731,800 | B1 | * | 5/2004  | Barthel et al. ............ 382/176 |
| 2001/0017712 | A1 |   | 8/2001 | Kasatani |
| 2003/0179409 | A1 | * | 9/2003 | Nishida ................... 358/2.1 |

FOREIGN PATENT DOCUMENTS

| JP | 09-181909   | 7/1997  |
| JP | 2001-312389 | 11/2001 |
| JP | 2002-232725 | 8/2002  |
| JP | 2003-219346 | 7/2003  |

* cited by examiner

*Primary Examiner*—Twyler L Haskins
*Assistant Examiner*—Fred Guillermety
(74) *Attorney, Agent, or Firm*—Oblon, Spivak, McClelland, Maier & Neustadt, L.L.P.

(57) ABSTRACT

A desired area, a desired resolution of the desired area, and a desired reduction ratio of an area other than the desired area are specified. An image data of the desired area is extracted from an image data of a document read at the desired resolution. A changed image data is created by changing the image data of the document based on the desired reduction ratio. The image data of the desired area and the changed image data are subjected to multi-page filing and saved as one file.

10 Claims, 8 Drawing Sheets

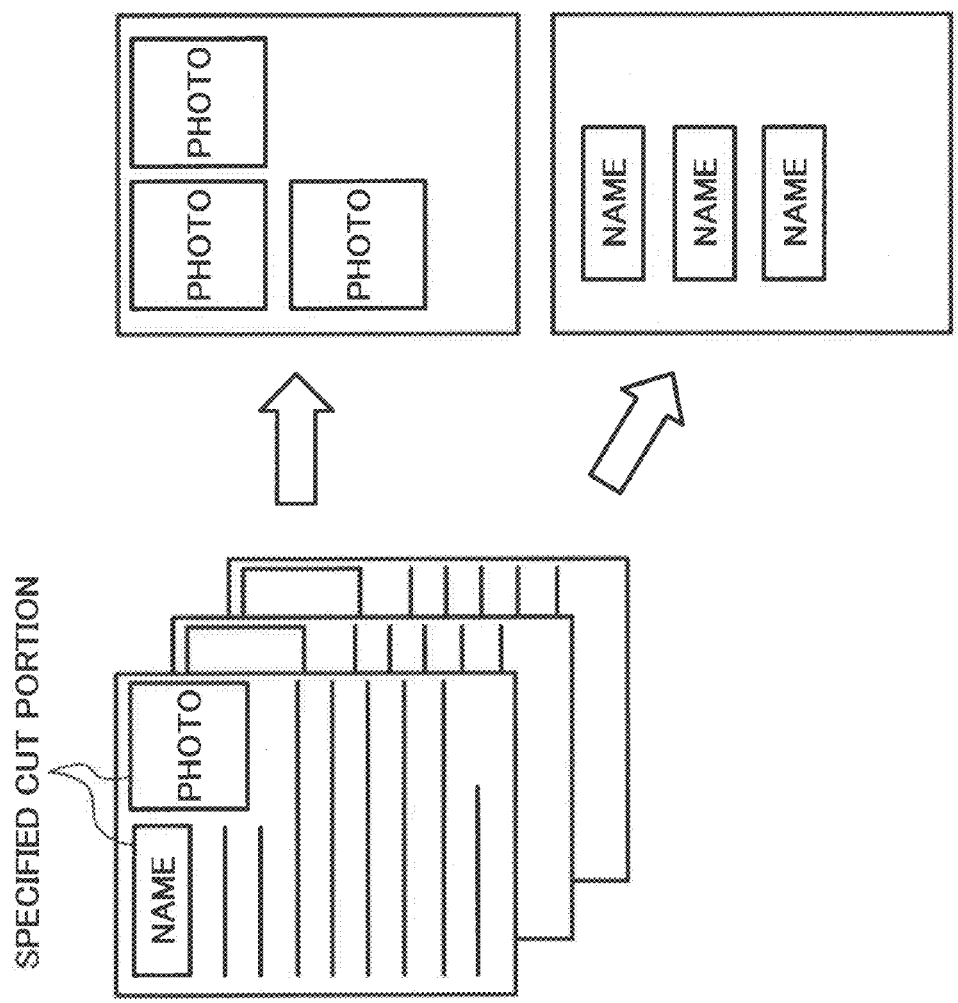

IMAGE PROCESSING APPARATUS, AND
COMPUTER PRODUCT, ALLOWING
SELECTIVE RESOLUTION OF AN AREA OF
A DOCUMENT

CROSS-REFERENCE TO RELATED
APPLICATIONS

The present document incorporates by reference the entire contents of Japanese priority document, 2003-290258 filed in Japan on Aug. 8, 2003.

BACKGROUND OF THE INVENTION

1) Field of the Invention

The present invention relates to an image processing apparatus. More particularly, the present invention relates to a digital color copy machine called as a Multi Function Peripheral (MFP).

2) Description of the Related Art

Nowadays, digital copy machines called MFPs are becoming popular. These MPFs include a facsimile (FAX), a printer, and a scanner. A conventional MPF has been disclosed in Japanese Patent Application Laid-Open Publication No. 2001-312389.

The digital copy machines can read handwritten documents or contents printed on papers and convert them into image data (electronic data). The image data is convenient because it can be shared and utilized by multiple users via a network. Therefore, many times the digital copy machines are connected to a network which allows sharing of the image data.

Some of the digital copy machines can even transmit the image data, which is read by its scanner, to other personal computers connected to a network. The image data can be transmitted as an attachment to an E-mail message, or as a separate file.

However, generally the size of the electronic data is quite large. Therefore, if the image data is frequently transmitted/received, the network traffic becomes heavy.

SUMMARY OF THE INVENTION

It is an object of the present invention to solve at least the problems in the conventional technology.

An image processing apparatus according to an aspect of the present invention includes an area-information receiving unit that receives information of a desired area; a resolution receiving unit that receives a desired resolution of the desired area; a reduction-ratio receiving unit that receives a desired reduction ratio of an area other than the desired area; an extracting unit that extracts an image data of the desired area from an image data of a document, wherein the image data of the document is obtained by reading the document with an image reading unit at the desired resolution; a changing unit that changes the image data of the document based on the desired reduction ratio to thereby obtain a changed image data; and a multi-paging unit that performs a multi-page filing on the image data of the desired area and the changed image data to save as one file.

A computer program according to another aspect of the present invention contains instructions which when executed on a computer causes the computer to execute receiving information of a desired area, a desired resolution of the desired area, and a desired reduction ratio of an area other than the desired area; extracting an image data of the desired area from an image data of a document, wherein the image data of the document is obtained by reading the document with an image reading unit at the desired resolution; changing the image data of the document based on the desired reduction ratio to thereby obtain a changed image data; and a multi-paging unit that performs a multi-page filing on the image data of the desired area and the changed image data to save as one file.

A computer-readable storage medium according to still another aspect of the present invention stores therein the above computer program according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is an illustration for explaining a process of collecting information to be captured at a high-resolution when a resume is used as an example.

DETAILED DESCRIPTION

Exemplary embodiments of an image processing apparatus and a computer product according to the present invention are explained below while referring to the accompanying drawings.

An image processing apparatus according to an embodiment will be explained with reference to FIGS. 1 to 8. The image processing apparatus according to the embodiment is applied to a digital color copy machine called MFP. The MFP has a copier, a FAX, a printer, a scanner, and can also transmit image data. The image data may be the one that is read by the scanner or that is input into the printer or the FAX from outside.

Figure 1:
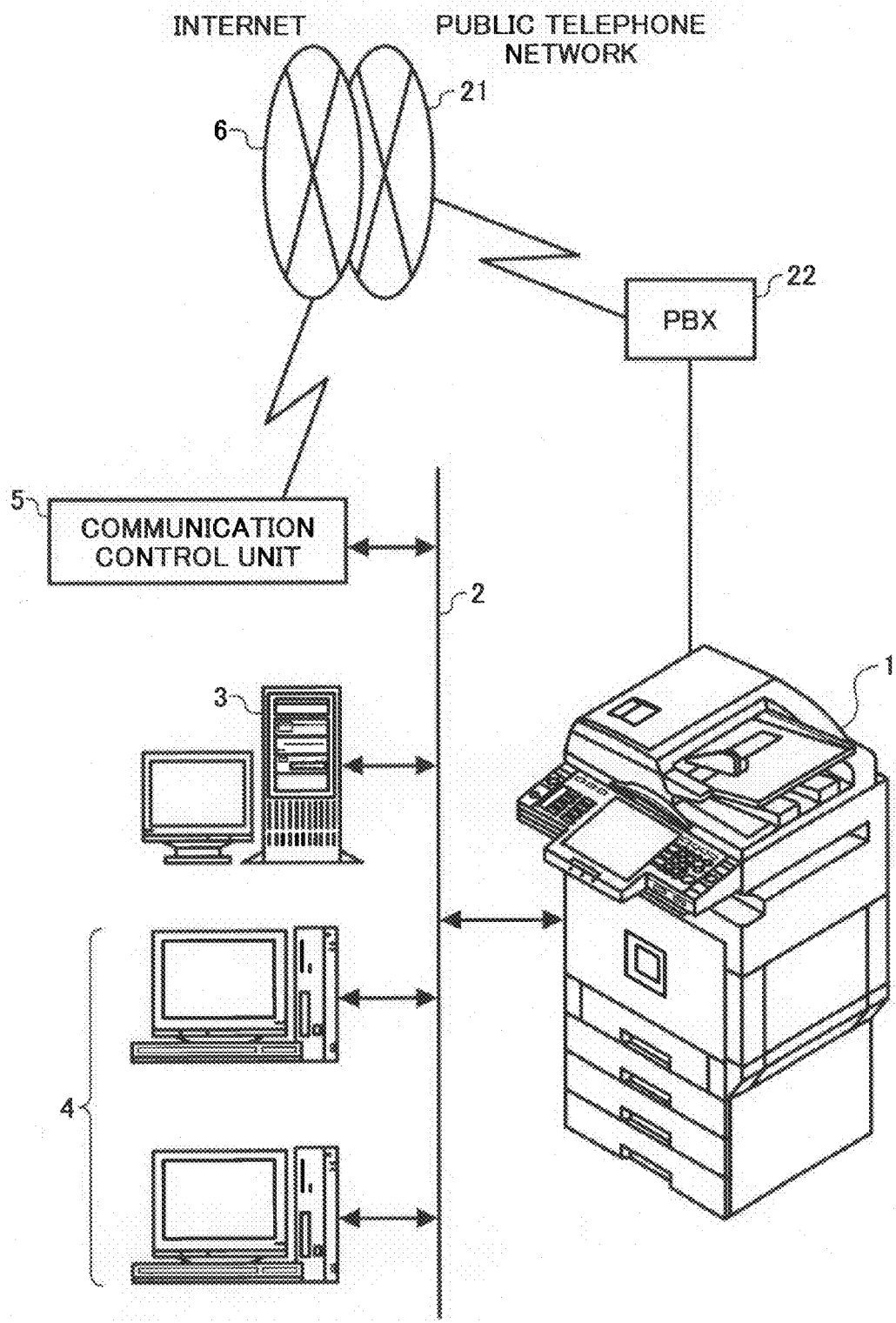
FIG. 1 is a configuration of a system that includes a digital color copy machine according an embodiment of the present invention.

FIG. 1 is a configuration of a system that includes a digital color copy machine 1 according to the embodiment. The system includes a server computer 3 and client computers 4 that are connected to the digital color copy machine 1 via a local area network (LAN) 2. The server computer 3 and the client computers 4 are information processing devices that execute various kinds of information processing. The server computer 3 supports protocols such as a file transfer protocol (FTP) and a hyper text transfer protocol (HTTP). The server computer 3 can function as a Web server, a mail server, and a domain name server (DNS). In other words, the system provides an environment in which image processing functions, such as image input, image output, and image storage, in the digital color copy machine 1, can be shared over the LAN 2.

The system is connected to the Internet 6 via a communication control unit 5, thereby enabling data communication with an external environment. The communication control unit 5 is a router, a modem, or a digital subscriber line (DSL) modem. However, any other structure that supports transmission control protocol/internet protocol (TCP/IP) communication may also be used. The LAN 2 may be wired or wireless. Wireless communication can be achieved, for example, by infrared rays and radio waves. Wired communication can be achieved, for example, using optical fibers.

Figure 2:
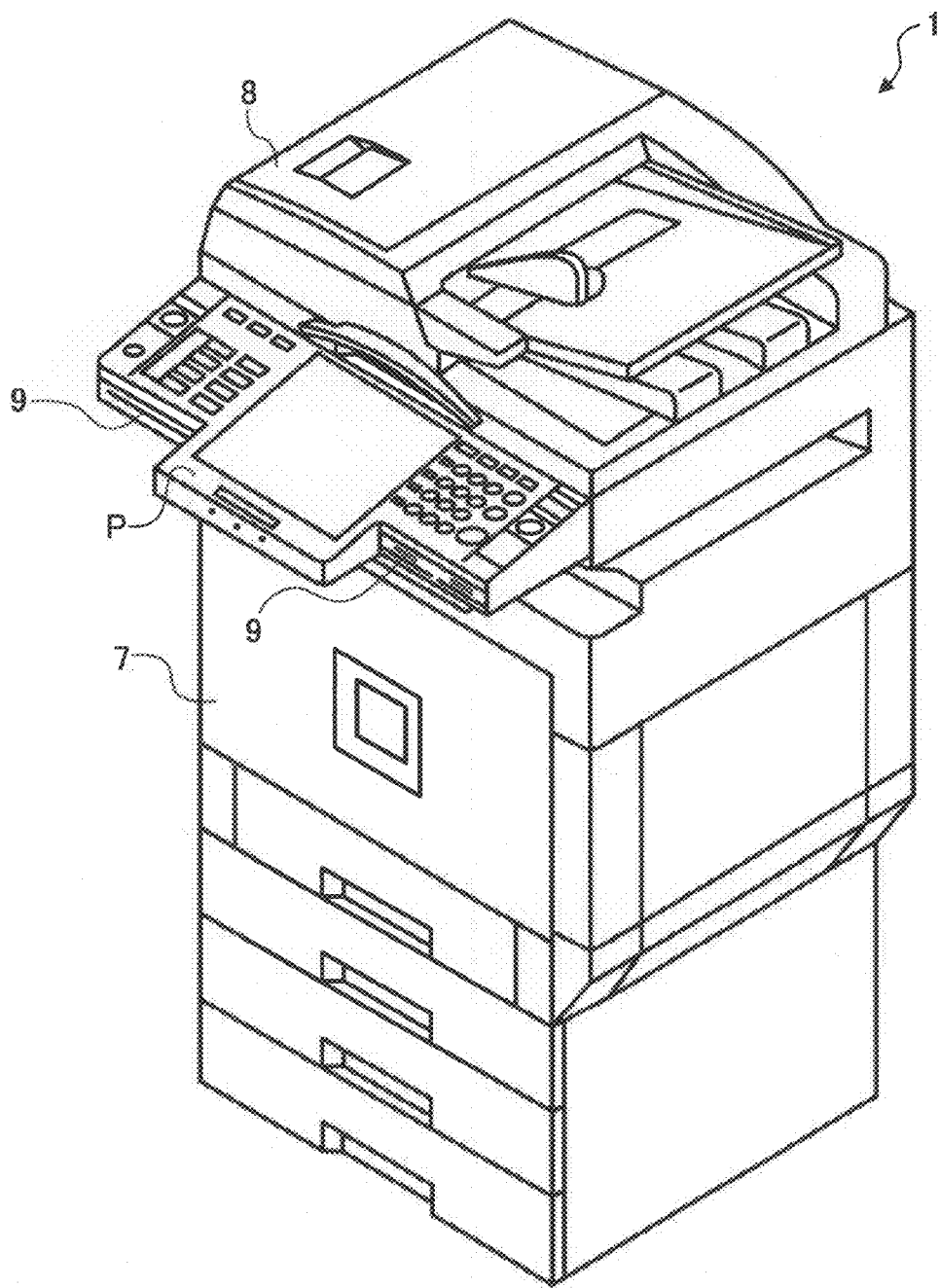
FIG. 2 is a perspective view of the digital color copy machine.
Figure 3:
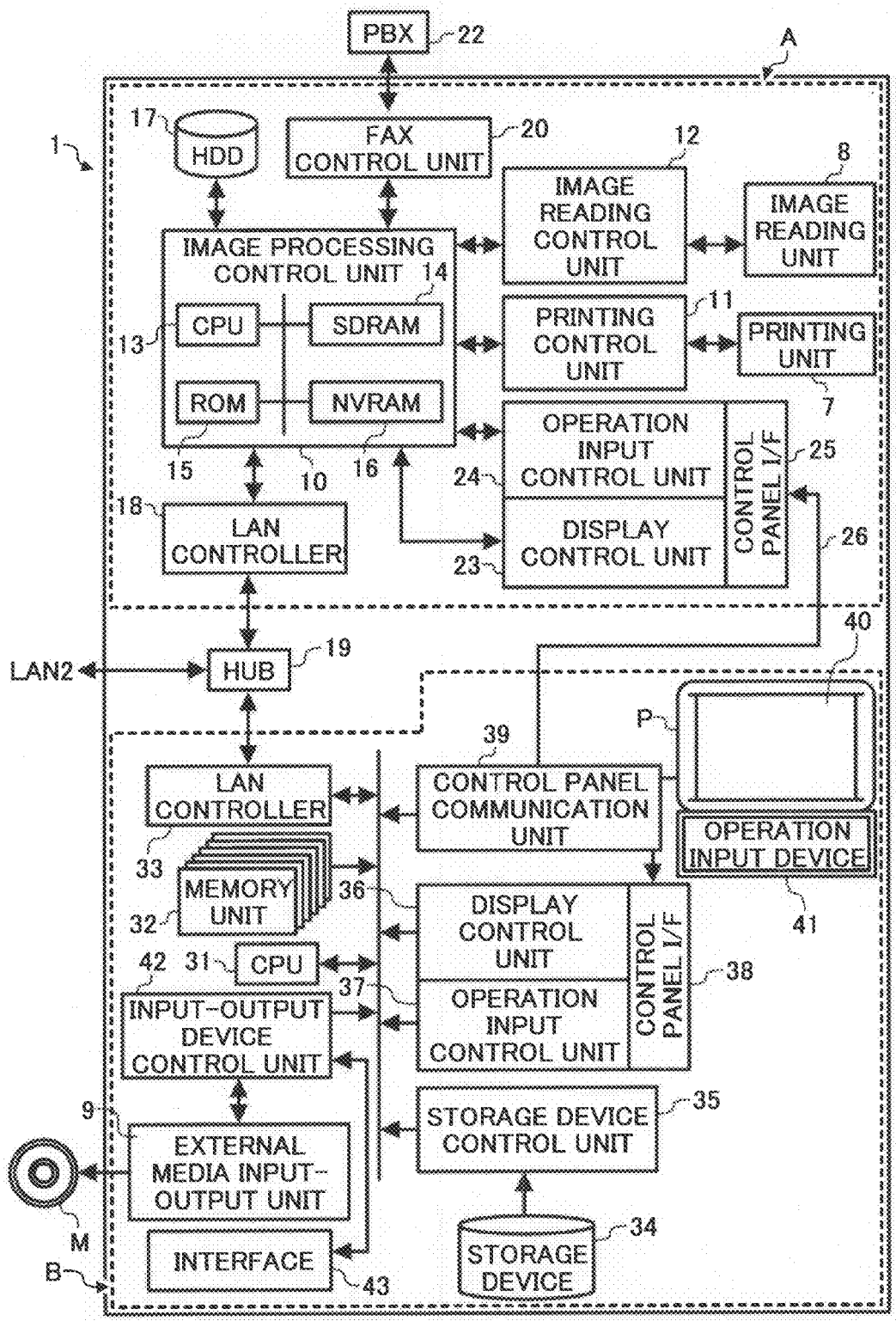
FIG. 3 is a functional block diagram of the digital color copy machine.

The digital color copy machine 1 will now be described in detail. FIG. 2 is a perspective view of the digital color copy machine 1 and FIG. 3 is a functional block diagram of the digital color copy machine 1. As shown in FIG. 2, the digital color copy machine 1 includes a printing unit 7, an image reading unit 8, an operation panel P, and an external media input-output unit 9. The printing unit 7 is an image forming unit that forms an image on a medium such as a transfer paper. The image reading unit 8 is disposed above the printing unit 7, and reads an image of a document. The external media input-output unit 9 is disposed below the operation panel P. The external media input-output unit 9 can read image files and program codes form a storage medium M (refer to FIG. 3), and can write image files and program codes on the storage medium M. The external media input-output unit 9 has an opening through which a storage medium M can be inserted. This opening is located at such a position that a storage medium M can be inserted in it easily.

The digital color copy machine 1 includes an image processing unit A and an information processing unit B as shown in FIG. 3. The printing unit 7 and the image reading unit 8 are included in the image processing unit A. The operation panel P and the external media input-output unit 9 are included in the information processing unit B.

The image processing unit A further includes an image-processing control unit 10 that controls image processing in the image processing unit A. A printing control unit 11 and an image-reading control unit 12 are connected to the image-processing control unit 10. The printing control unit 11 controls the printing unit 7 and the image-reading control unit 12 controls the image reading unit 8.

The image-processing control unit 10 controls the printing control unit 11. According to control of the image-processing control unit 10, the printing control unit 11 outputs instructions to print data including image data to the printing unit 7. The printing unit 7 forms and outputs an image on a medium such as transfer paper. The printing unit 7 is capable of full-color printing. The printing unit 7 can be realized using any known printing methods such as thermal sublimation transferring, silver halide photography, direct thermal recording, and hot melt thermal transferring may be employed, besides electrophotography.

The image-reading control unit 12 drives the image reading unit 8 under the control of the image-processing control unit 10. The image reading unit 8 optically reads the image of the document. Precisely, a lamp irradiates a light on the document, and the light reflected from the document is received by a photoreceptor via a mirror or a lens. The photoreceptor is, for example, a charge coupled device (CCD). The image-reading control unit 12 performs analog to digital conversion of the read image, and creates digital image data of eight bits of each of red, green, and blue (RGB).

The image-processing control unit 10 is a microcomputer that includes a central processing unit (CPU) 13, a synchronous dynamic random access memory (SDRAM) 14 such as memory device, a read only memory (ROM) 15, and a non-volatile random access memory (NVRAM) 16 which are connected by a bus. The CPU 13 is the main processor. The SDRAM 14 stores the image data. The ROM 15 stores control programs etc. The NVRAM 16 holds data which has information such as system log, system setting, and log information recorded in it, even when the power supply is put OFF.

A hard disk drive (HDD) 17, a LAN controller 18, and a FAX control unit 20 are connected to the image-processing control unit 10. The HDD 17 stores job history and image data in a large quantity. The LAN controller 18 connects the image processing unit A to the LAN 2 via a HUB 19 inside the unit that is a line concentrator. The FAX control unit 20 performs the FAX control. The FAX control unit 20 is connected to an exchanger (PBX) 22 that leads to a public telephone network 21, thereby enabling the digital color copy machine 1 to communicate with a remote FAX.

Further, a display control unit 23 and an operation-input control unit 24 are connected to the image-processing control unit 10. The display control unit 23 outputs an image-display control signal to the information processing unit B via a communication cable 26 that is connected to a control panel I/F 25 by the control by the image-processing control unit 10, and performs the control of the image display of the operation panel P of the information processing unit B. The operation-input control unit 24 inputs an input control signal according to the function setting and the input operation by an operator from the operation panel P in the information processing unit B via the communication cable 26, which is connected to the control panel I/F 25, by the control by the image-processing control unit 10. In other words, the image processing unit A can directly monitor the operation panel P via the communication cable 26.

Therefore, in the image processing unit A, the communication cable 26 is connected to the image processing unit that is included in the conventional image processing apparatus, and the operation panel P in the information processing unit B is used. In other words, the display control unit 23 and the operation-input control unit 24 in the image processing unit A operate as units connected to the operation panel P.

The image processing unit A analyzes a command that carries printing instructions and printing data as image information from the external devices (the server computer 3, the client computer 4, and the facsimile etc.), performs bitmap conversion of the printing data so that the printing data can be printed as output image data, then analyses the printing mode from the command, and determines the operation. The printing data and the command are received either via the LAN controller 18 or via the FAX control unit 20.

The image processing unit A can transfer document reading data and printing data stored in the SDRAM 14 and the HDD 17, can output image data that is processed for outputting the document reading data and the printing data, and compressed data obtained by compressing the document reading data and the printing data, to external devices (i.e. to the server computer 3, the client computer 4, and to the facsimile etc.).

Further, the image processing unit A transfers the image data that is read by the image reading unit 8 to the image-processing control unit 10. The image processing unit A, then, applies correction to the signal deterioration caused due to quantization of an optical system and a digital signal, and writes this image data in the SDRAM 14. Thus, the image data stored in the SDRAM 14 is converted into output image data in the printing control unit 11, and is output to the printing unit 7.

The information processing unit B is now explained in detail. The information processing unit B has a structure of a microcomputer that is controlled by a general-purpose operating system (OS) which is used in an information processing unit called as a personal computer in general. The information processing unit B includes a CPU 31 which is a main processor. The CPU 31 includes a memory unit 32 and a storage-device control unit 35 that are connected by the bus connection. The memory unit 32 includes a read only memory (ROM) that is a memory exclusively for reading and has a start-up computer program and random access memory (RAM) that is a working area of the CPU 31, stored in it. The storage-device control unit 35 controls input and output of data to and from a storage device 34 such as an HDD which stores the OS and an application program.

A LAN controller 33 that connects the information processing unit B to the LAN 2 via the HUB 19 is connected to the CPU 31. An Internet protocol (IP) address that is a network IP address assigned to the LAN controller 33 is different from the IP address that is assigned to the LAN controller 18 of the imaged processing unit A. Thus, the digital color copy machine 1 is assigned with two IP addresses. In other words, the image processing unit A and the information processing unit B are connected to the LAN 2 and the data exchange between the image processing unit A and the information processing unit B is possible.

Since the digital color copy machine 1 is connected to the LAN 2 via the HUB 19, apparently it looks as if only one IP address is assigned. Therefore, wiring connections etc. can be made easily without disturbing the neat appearance.

Figure 4:
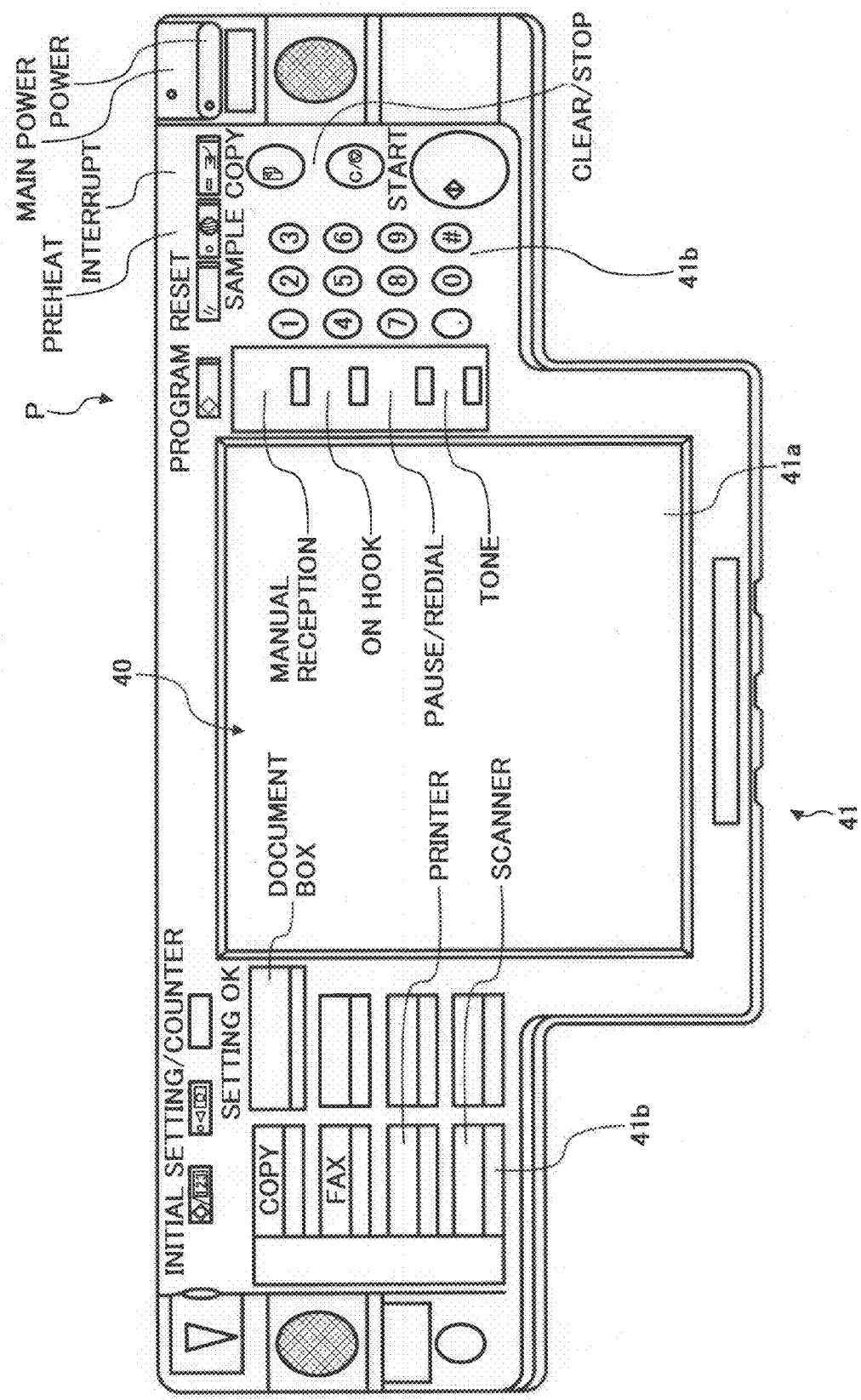
FIG. 4 is a top view of an operation panel.

Moreover, an operation-input control unit 37 and a display control unit 36 that controls the operation panel P are connected to the CPU 31. FIG. 4 is a top view of the operation panel P. The operation panel P includes a display unit 40, which is, for example, a liquid crystal display (LCD), and an operation-input device 41. The operation-input device 41 includes a touch panel 41a and a keyboard 41b. The touch panel 41a is of a type such as ultrasonic and acoustic waves laminated on the display unit 40 and the keyboard 41b includes a plurality of keys. The keyboard 41b includes keys such as a start key to indicate start of image reading, a numeric key pad to input values, a reading-condition setting key to set destination to which the image data read is transmitted, and a clear key. Thus, the display control unit 36 outputs the image-display control signal to the display unit 40 via a control panel I/F 38, and displays, on the display, predetermined items in accordance with the image-display control signal unit 40. On the other hand, the operation-input control unit 37 receives an input control signal according to the function setting and the input operation by the operator at the operation-input unit 41 via the control panel I/F 38.

A control panel communication unit 39 that is connected to the control panel I/F 25 in the image processing unit A via the communication cable 26 is connected to the CPU 31. The control panel communication unit 39 receives the image-display control signal that is output from the image processing unit A, and transmits an input control signal according to the function setting and the input operation by the operator at the operation panel P to the image processing unit A. More concretely, the image-display control signal from the image processing unit A that is received at the control panel communication unit 39 is subjected to data conversion to be displayed on the display unit 40 in the operation panel P, and then, is output to the display control unit 36. The input control signal according to the function setting and the input operation by the operator at the operation panel P is subjected to data conversion to correspond to a format according to the specifications in the image processing unit A, and then, is input to the control panel communication unit 39.

Thus, the application program and the OS to be executed by the CPU 31 are stored in the storage device 34. In this context, the storage device 34 functions as a storage medium that stores the application program. In this digital color copy machine 1, when the user turns power on, the CPU 31 starts a start-up program stored in the memory unit 32, and reads the OS stored in the storage device 34 into the RAM inside the memory unit 32 to start the OS. The OS enables the computer program to be executed according to the user's operation, reads and saves information. Windows (registered trademark) is an example of a typical OS. Operation program running on such the OS is called as an application program. The OS for the information processing unit B is a same OS as the OS for the information processing unit (such as the server computer 3 and the client computer 4), i.e. a general-purpose OS such as Windows (registered trademark).

The digital color copy machine 1 includes the external media input-output unit 9 that can handle a flexible disk drive, an optical disk drive, a magneto-optical disk drive, and a semiconductor media drive. These types of drives read code included in a computer program and an image file etc. which are stored in the storage medium M such as a flexible disk (FD), a hard disk, an optical disk (such as a compact disc—read only memory (CD-ROM), compact disc—recordable (CD-R), digital versatile disc—read only memory (DVD-ROM), digital versatile disc—random access memory (DVD-RAM), digital versatile disc—recordable (DVD-R, DVD+R), digital versatile disc—rewritable (DVD-RW, and DVD+RW), a magneto-optical disk (MO), and a semiconductor medium. Program codes (control computer program) such as various application programs of OS and drives, and image files are stored in the storage medium M. Such the external media input-output unit 9 functions as a reading unit that reads data stored in a medium. The external media input-output unit 9 is controlled by an input-output device control unit 42 that is connected to the CPU 31 by the bus connection.

The application program to be stored in the storage device 34 may be an application program obtained by installing an application program stored in the storage medium M. Therefore, the storage medium M can also function as the storage medium that stores the application program. Moreover, the application program may be obtained from an external source via the Internet 6 and the LAN 2 to be installed in the storage device 34.

Various interfaces 43, such as a universal serial bus (USB), IEEE 1394, and a small computer system interface (SCSI), are connected to the input-output device control unit 42. Various external equipments (such as a digital camera) can be connected via these interfaces 43.

The information processing unit B is connected to the server computer 3, which functions as a mail server and DNS etc., via the LAN 2, as well as to the Internet 6 via the communication control unit 5. Mail software, which is an application program, is installed in the storage device 34, and transmission and reception of E-mail is possible in the information processing unit B provided that a mail account (mail address) is assigned to the information processing unit B.

The following is a description of a function peculiar to the digital color copy machine 1. Since the function of the image processing unit A of the digital color copy machine 1 is not much different from the function of the conventional digital color copy machine, the description of the function is omitted here. Among arithmetic processing that is executed by the CPU 31 in the information processing unit B according to the application program, which runs on the OS, the processing peculiar to the embodiment is described below.

A multi-page file creating process executed by the CPU 31 is now explained in detail. The multi-page file creating process includes creating a multi-page file that includes data in high resolution and data in low resolution. Image data of a portion that includes important information in a document is processed in high resolution, and image data of a other portion in the document is processed in low resolution. For example, in a document on which a seal is stamped, a portion in which the seal is stamped includes important information to identify a shape of a stamp, therefore, image data of the portion is in high resolution. On the other hand, image data of other part of the document is in low resolution.

Figure 5:
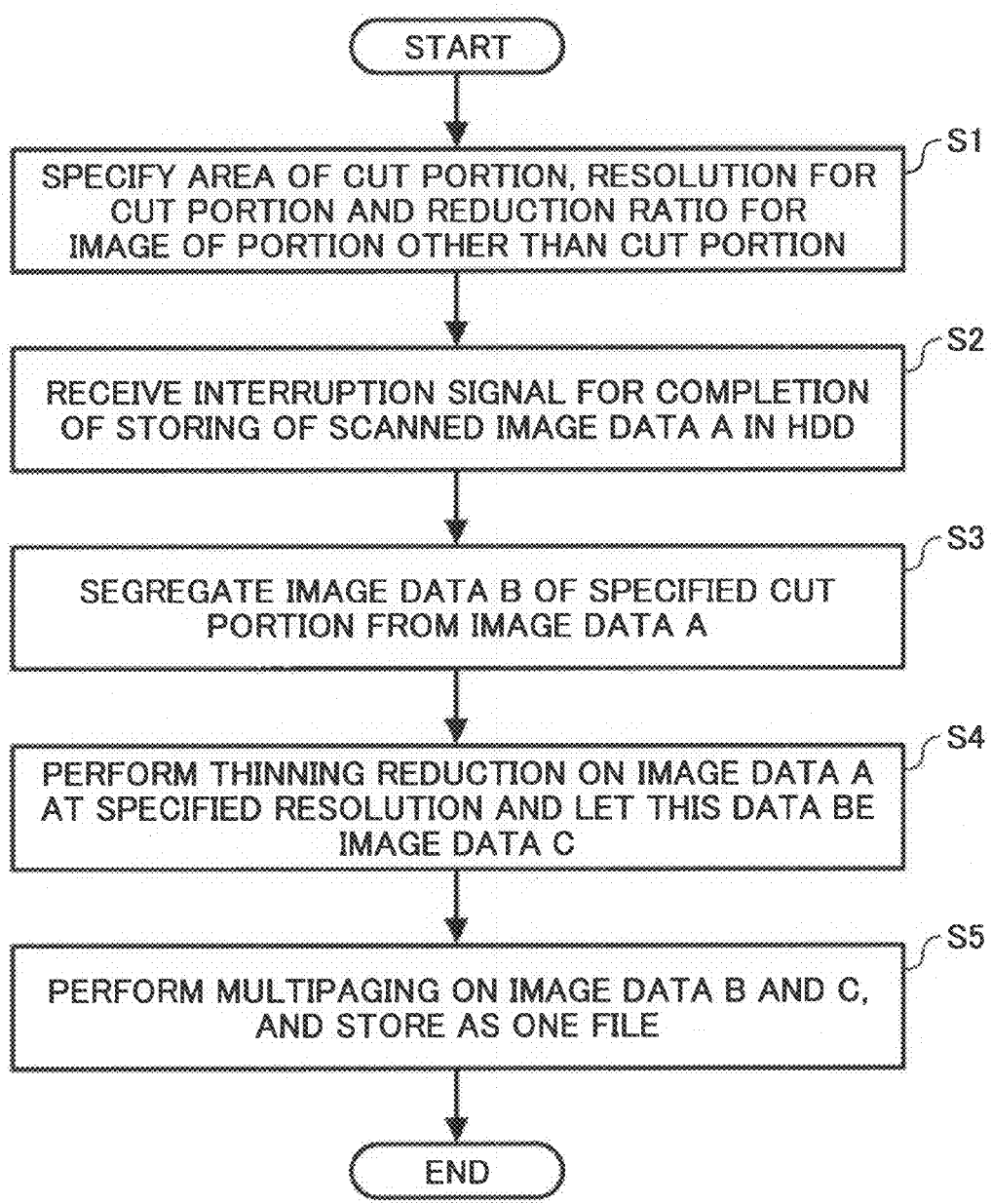
FIG. 5 is a flow chart of a multi-page file creating process.
Figure 6:
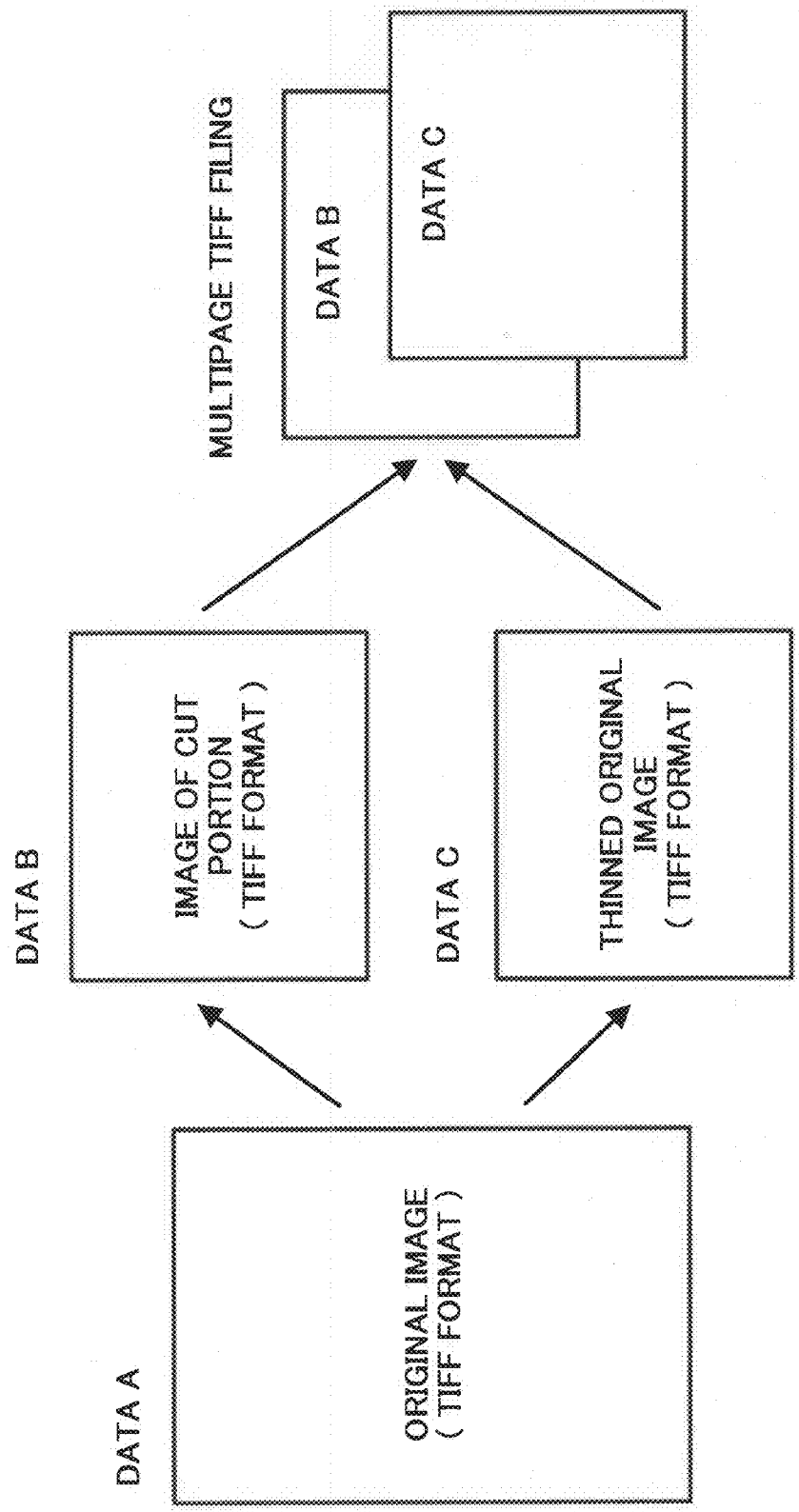
FIG. 6 is a diagram for explaining a process of creating image data in the multi-page file creating process.
Figure 7:
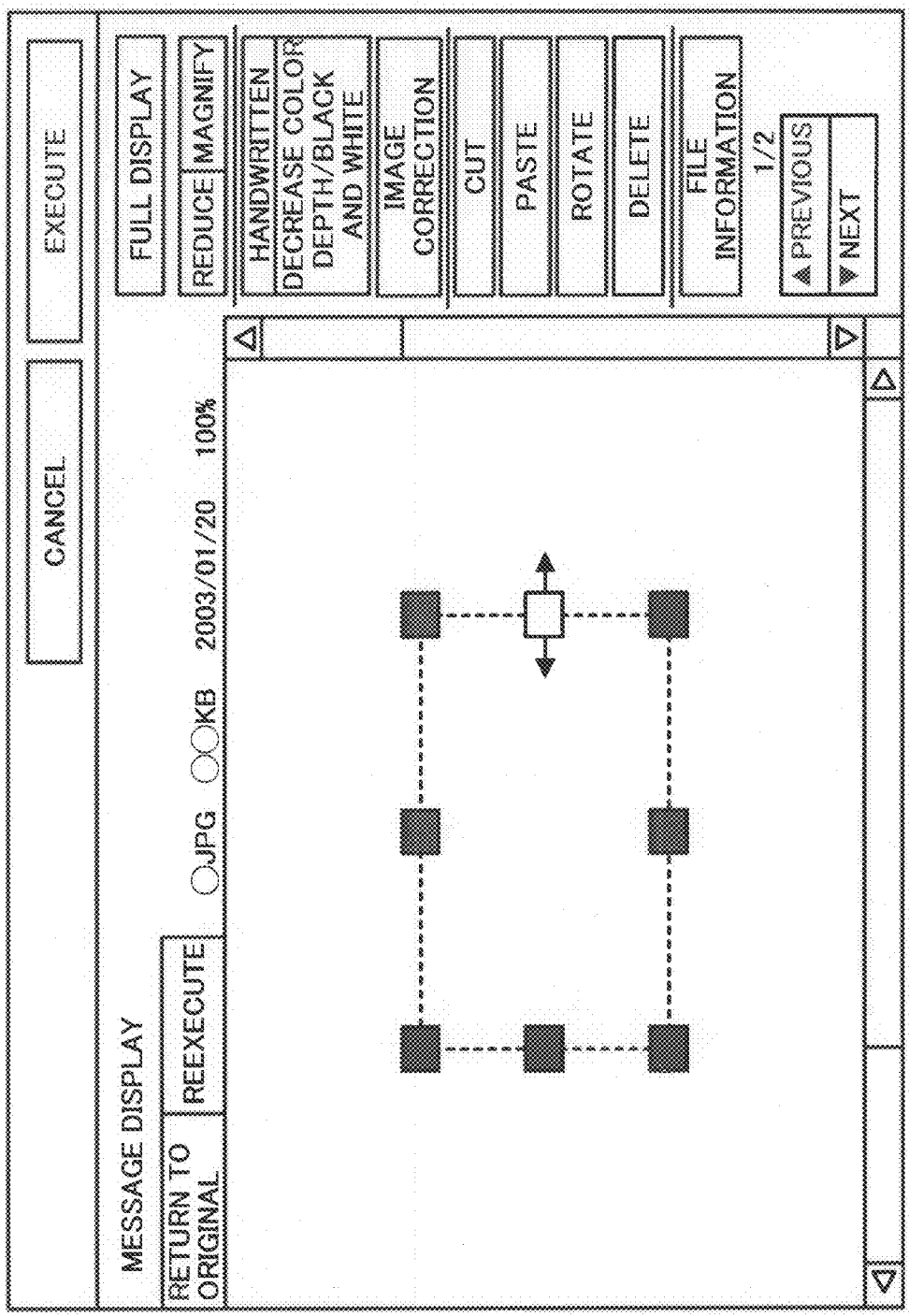
FIG. 7 is an illustration of a screen for specifying an area of a cut portion.

FIG. 5 is a flow chart of the multi-page file creating process and FIG. 6 is a diagram for explaining a process of creating image data in the multi-page file creating process. First of all, in the multi-page file creating process, an area is specified as a cut portion, and resolution for an image in the cut portion and reduction ratio for an image in a portion other than the cut portion are specified (step S1: area-specification receiving unit, specified-area resolution specifying unit, and area other than specified area reduction ratio specifying unit). Such information specified is input by an operator by operating the operation panel P. For example, for specifying the portion other than the cut portion, a screen P1 shown in FIG. 7 is displayed on the display unit 40 of the operation panel P. As shown in the screen P1, the area of the cut portion can be specified by range specification method using diagonal definition via the touch panel 41*a*. It is desirable that the area of the cut portion is specified with a test scan screen displayed on the display unit 40. If information of coordinates that indicates the area of the cut portion is known beforehand, the area may be specified by inputting the information of the coordinates. The number of the area to be specified as the cut portion is not limited, and a plurality of areas may be specified.

Further, the whole surface of the document is scanned by the image reading unit 8 at the resolution specified for the cut portion in step S1. The scanned image data DA (in TIFF format) is stored in the HDD 17 in the image processing unit A. When the storing of the image data DA in the HDD 17 is completed, an interruption signal of storage completion in the HDD is transmitted to the information processing unit B via the LAN controller 18, and the CPU 31 in the information processing unit B receives this interruption signal (step S2).

As the interruption signal is received, the CPU 31 in the information processing unit B loads the image data DA stored in the HDD 17 to the memory unit 32 in the information processing unit B via the LAN controller 33, and segregates and extracts image data DB, which includes the image data of the cut portion, from the image data DA in the memory unit 32 (step S3: specified area image extracting unit).

Volume of the image data DA is reduced by thinning at the reduction ratio specified (by decreasing the resolution of the image data DA) in the memory unit 32, and as a result, an image data C in low resolution is created (step S4: changing unit).

Finally, the image data DB of the cut portion in high resolution and the image data C in low resolution are associated as one file (multi-page file), and stored in the storage device 34 (step S5: multi-paging unit).

Thus, if a sealed document is used, because a portion in which a seal is stamped includes important information, the portion is specified as the cut portion to form high-resolution information (image data DB), and portion other than portion in which a seal is stamped forms low-resolution information (image data C). The image data DB of the cut portion, which is in high resolution (stamped portion), and the image data C, which is in low resolution, can be saved in a form of a multi-page file.

In this case, the image data DB that is cut is left in the image data DA. However, an arrangement may be made such that the image data DB is not to be left in the image data DA. Moreover, in the reduction of the image data DA, options such as no reduction, reduce to ½, and reduce to ¼ etc may be provided. In multi-paging, a page in which the image data is to be arranged may also be selectable. Further, reduction in the resolution of the image data DA may be carried out by decreasing color depth (black and white).

If there is a plurality of documents, it is also possible to compile only the high-resolution information (image data DB) that is cut. FIG. 8 is an illustration for explaining a process of collecting the high-resolution image information (image data DB) when a resume is used as an example. As shown in FIG. 8, when a name section and a photo section are specified as the cut portions, information in the resume can be collected per item by extracting the high-resolution image information (image data DB) in an order in which each of the items are scanned by the image reading unit 8. The information collected can be used to make a cover sheet etc.

The image data of the specified area that is extracted from the image data of the original document, and that is read at resolution for the specified area, and changed image data which is obtained by changing the image data of the original document based on the reduction ratio for the area other than the specified area, are subjected to multi-paging and saved as one file. By doing so, when a particular portion in an image is important, only the particular portion is read a high resolution to form the high-resolution image data and the remaining portion is read at low resolution by thinning the image to form the low-resolution image data. The high-resolution image data and the low-resolution image data can then be subjected to multi-page filing. Therefore, as compared to a case where the whole information is regarded as the high-resolution image data, it is possible to reduce the volume of the file. Therefore, it is possible to send the image data file by attaching to an E-mail, and to reduce the network traffic while sending the file without lowering the resolution for the image that includes the important information.

The present invention is not limited only to the digital color copy machine. In other words, the present invention may be applied to an image processing apparatus that includes at least one of an image forming unit (printing unit 7) that is connected via the LAN 2 to the server computer 3 and the client computer 4 and forms an image on a medium based on the image data, and an image reading unit (image reading unit 8) that reads an image on a document. Thus, the present invention can be applied to apparatuses such as a digital monochrome copy machine, a monochrome copy machine, a scanner, a monochrome printer, and a color printer.

According to the present invention, image data of a specified area that is extracted from image data of the original document that is read at resolution specified for the specified area and changed image data that is obtained by changing the image data of the original document based on a reduction ratio specified for an area other than the specified area, are stored as a single file by performing multi-paging. If a particular portion in an image is important, only that important portion is processed to form high-resolution image data and the remaining portion is processed to form low-resolution image data by thinning, and both the high-resolution image data and the low-resolution image data form one file as a multi-page file. Thus, volume of the file can be low compared to a file in which whole contents of the file is the high-resolution image data. Therefore, it is possible to send the image data file by attaching to an E-mail, and to contribute to reduce the network traffic while sending the file without lowering the resolution of the image that includes the important information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
    an area-information receiving unit that receives information of a desired area of a document, the desired area specifying a location on the document selected by an operator;
    a resolution receiving unit that receives a desired resolution of the desired area of the document;
    a reduction-ratio receiving unit that receives a desired reduction ratio of resolution of the document;
    an extracting unit that extracts an image data of the desired area of the document from an image data of the document, wherein the image data of the document is obtained by reading the document with an image reading unit at the desired resolution;
    a changing unit that changes the image data of the document based on the desired reduction ratio of resolution of the document to thereby obtain a changed image data; and
    a multi-paging unit that performs a multi-page filing on the image data of the desired area of the document, which is selected by the operator and which is at the desired resolution, and the changed image data, which is the document, including the desired area of the document, at the reduction ratio of resolution, to save as one file.

2. The image processing apparatus according to claim 1, wherein the changing unit obtains the changed image data by reducing a resolution of the image data of the document.

3. The image processing apparatus according to claim 1, wherein the changing unit obtains the changed image data color reduction of the image data of the document.

4. The image processing apparatus according to claim 1, wherein the desired area is specified by the operator with a test scan screen displayed on a display unit.

5. The image processing apparatus according to claim 1, wherein image data of a specified area of each of a plurality of documents is collected and output together.

6. A computer-readable storage medium that stores a computer program that contains instructions which, when executed on a computer, cause the computer to execute a method comprising:
    receiving information of a desired area of a document specifying a location on the document selected by an operator, a desired resolution of the desired area of the document, and a desired reduction ratio of resolution of the document;
    extracting an image data of the desired area of the document from an image data of the document, wherein the image data of the document is obtained by reading the document with an image reading unit at the desired resolution;
    changing the image data of the document based on the desired reduction ratio of resolution of the document to thereby obtain a changed image data; and
    a multi-paging unit that performs a multi-page filing on the image data of the desired area of the document, which is selected by the operator and which is at the desired resolution, and the changed image data, which is the document, including the desired area of the document, at the reduction ratio of resolution, to save as one file.

7. The computer-readable storage medium according to claim 6, wherein the changing includes obtaining the changed image data by reducing a resolution of the image data of the document.

8. The computer-readable storage medium according to claim 6, wherein the changing includes obtaining the changed image data color reduction of the image data of the document.

9. The computer-readable storage medium according to claim 6, wherein specifying the location on the document selected by the operator is executed with a test scan screen displayed on a display unit.

10. The computer-readable storage medium according to claim 6, wherein the method executed by the computer further comprises collecting and outputting image data of a specified area of each of a plurality of documents together.

* * * * *